US 8,315,365 B2

(12) United States Patent
Varadarajan et al.

(10) Patent No.: US 8,315,365 B2
(45) Date of Patent: Nov. 20, 2012

(54) SYSTEM AND METHOD FOR REVENUE UNLEAKING

(75) Inventors: Sridhar Varadarajan, Bangalore (IN); Mamatha Kaolabal, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 799 days.

(21) Appl. No.: 12/501,762

(22) Filed: Jul. 13, 2009

(65) Prior Publication Data

US 2011/0010225 A1  Jan. 13, 2011

(51) Int. Cl.
*H04M 15/00* (2006.01)

(52) U.S. Cl. .............. 379/114.04; 379/114.14; 455/408; 705/7

(58) Field of Classification Search ............. 379/114.04, 379/114.14; 455/408; 705/7
See application file for complete search history.

(56) References Cited

U.S. PATENT DOCUMENTS

| 6,721,405 | B1 | 4/2004 | Nolting et al. |
| 6,928,150 | B2 | 8/2005 | Johnston |
| 7,436,942 | B2 | 10/2008 | Hakala et al. |
| 7,440,557 | B2 | 10/2008 | Gunderman, Jr. |
| 7,469,341 | B2 | 12/2008 | Edgett et al. |
| 7,761,084 | B2 * | 7/2010 | Thistle et al. ............ 455/408 |
| 7,961,857 | B2 * | 6/2011 | Zoldi et al. ............ 379/114.14 |
| 2006/0206941 | A1 | 9/2006 | Collins |
| 2007/0036309 | A1 | 2/2007 | Zoldi et al. |
| 2007/0207774 | A1 | 9/2007 | Hutchinson et al. |
| 2008/0056144 | A1 | 3/2008 | Hutchinson et al. |
| 2008/0301018 | A1 | 12/2008 | Fine et al. |
| 2009/0076866 | A1 * | 3/2009 | Zoldi et al. ............ 705/7 |

OTHER PUBLICATIONS

"Global Revenue Assurance Survey—Taking revenue assurance to the next level" by Ernst & Young (Presentation, May 8, 2008).
"Revenue Assurance Stops the Leak" by Shira Levine and Lorein Pratt (appeared in Telecommunications Online, Oct. 1, 2005) from http://www.telecommazine.com/article.asp?HH_ID=AR_1185.
"Mobile Content Revenue Leakage: These's a Hole in the Bucket" by iGilliot Research (White Paper, Sep. 2005).
"Mediation Systems Halt Revenue Leakage" by John L. Guerra (appeared in B/OSS—Billing and OSS World, Apr. 1, 2005) from http://www.billingworld.com/articles/feature/ Mediation Systems Halt Revenue Leakage.

* cited by examiner

*Primary Examiner* — Fan Tsang
*Assistant Examiner* — Van D Huynh
(74) *Attorney, Agent, or Firm* — Venable LLP; Jeffri A. Kaminski

(57) ABSTRACT

Revenue leakage is one of the major concerns of telecom operators worldwide. There are several reasons for revenue leakage including frauds, data loss, poor utilization of network infrastructure, and churn. With the growth in subscriber base and increased competition in the market space, the lack of control on revenue leak could potentially affect the profit margins drastically. The operators are ever looking for solutions that could limit the various aspects of the revenue leakage. A system and method for addressing revenue leakage due to data loss in general and incomplete/partial data in particular needs to handle the issues related to the obtaining of additional information so that incomplete/partial data records lead to additional billing opportunity for the operators.

24 Claims, 16 Drawing Sheets

OVERVIEW OF A SYSTEM ARCHITECTURE OF RUM SYSTEM

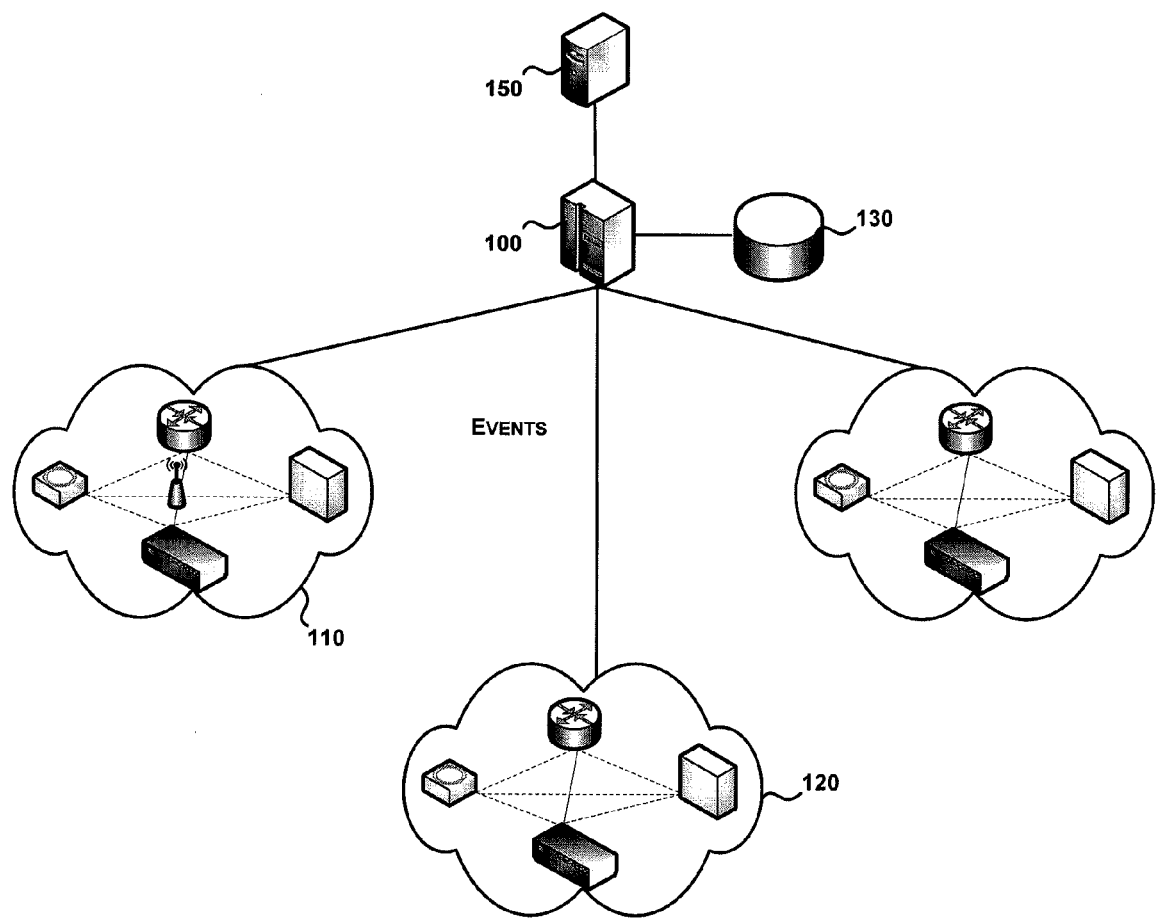
FIG. 1: OVERVIEW OF A MEDIATION SYSTEM

REVENUE LEAK ASPECTS

1. FRAUDS — IDENTITY THEFT, HANDSET INSTRUMENTATION, PRE-PAID AND POST-PAID FRAUDS, ...
2. DATA LOSS — SYSTEMS, NETWORK ELEMENTS, LINKS, INCORRECT / INCOMPLETE DATA, ...
3. UTILIZATION — POORLY OPTIMIZED CALL ROUTING, MISMATCHED CONFIGURATION, UNSCHEDULED MAINTENANCE, ...
4. COLLECTION — INADEQUATE CREDIT MANAGEMENT, CHURN, ...

REVENUE LEAK PERSPECTIVES

1. SUBSCRIBERS — INITIATE SESSIONS THAT RESULT IN BILLING
2. NETWORKS — TRANSPORT SUBSCRIBER SESSIONS
3. POLICIES — ENFORCE SUBSCRIBER PRICE PLANS AND BILLING GUIDELINES
4. REGIONS — REGION-WISE ANALYSIS OF BILLING AND REVENUE LOSS

REVENUE ASSURANCE

1. MEDIATION SYSTEMS TO COLLECT SUBSCRIBER USAGE DATA
2. CREATING OF DATA BASED ON CALL EVENTS OBTAINED FROM NETWORK COLLECTION POINTS: MATCH DATA OBTAINED DURING THE CALL SETUP, OBTAIN THE SECOND HALF OF THE CALL, AND COMBINE THE DATA INTO A SINGLE CALL DATA
3. SIGNALING RECORDS TO PROVIDE SIGNALING MESSAGES ASSOCIATED WITH SUBSCRIBER SESSIONS
4. CORRELATION OF MULTIPLE PARTS OF A CALL DATA RECORD AND ACROSS MULTIPLE DATA SOURCES
5. SESSION RECORDS ARE TO BE OBTAINED FOR A VARIETY OF SERVICES OFFERED BY A PROVIDER SUCH AS VOIP CALLS, TEXT MESSAGES, MULTIMEDIA MESSAGES, EMAILS, RING TONES, BROWSING SESSIONS, MP3 DOWNLOADS, TRADITIONAL AND WIRELESS CALLS, EVENTS AND NOTIFICATIONS, AND LOCATION BASED SERVICES

FIG. 2: ASPECTS OF REVENUE LEAKAGE

CRITICAL FACTOR IN REVENUE UNLEAKING:

INCOMPLETE / PARTIAL DATA

INABILITY TO GENERATE A VALID DATA RECORD FOR BILLING LEADS TO THE LOSS OF COLLECTION POINTS (REVENUE LEAK)

SOME REASONS FOR THE GENERATION OF PARTIAL DATA:

SESSION GETS INTERRUPTED THROUGH A DROPPED CONNECTION;
INCORRECTNESS DUE TO INCONSISTENT TIMESTAMPING;
INCONSISTENCY DUE TO TOO MUCH OF DIFFERENCE IN TIMESTAMPS;
INCONSISTENCY DUE TO MISMATCH IN IDENTIFIER DETAILS;
MISSING START/END DATA;
FAILURE IN A NETWORK ELEMENT;
INCONSISTENT CONFIGURATION;
INADVERTENT CONFIGURATION CHANGES;
INTERNAL BUFFER OVERFLOW IN A SYSTEM OR A NETWORK ELEMENT;
INADVERTENT BRINING DOWN OF A SYSTEM OR A NETWORK ELEMENT FOR MAINTENANCE;

FIG. 3: REVENUE LEAKAGE FACTOR

AN APPROACH FOR REVENUE UNLEAKING:

A COLLECTION OF RUM SYSTEMS ARE DISTRIBUTED THROUGHOUT THE NETWORK

RUM SYSTEMS RECEIVE POLL DATA FROM NETWORK ELEMENTS:
 POLLTYPE (A|Z|S|E|D)
 TIMESTAMP (ELEMENT)
 ADDRESS (SOURCE, DESTINATION, ELEMENT)

FOUR-WAY RECONCILIATION:
 SUBSCRIBER TERMINALS AND/OR SERVERS
 NETWORK ELEMENTS
 CALL DATA RECORDS (GENERATED BY MEDIATION SYSTEMS)

BACKUP DATA RECORDS (BDRs) ARE DERVIED BASED ON NETWORK UTILIZATION FROM RUM SYSTEMS
CALL DATA RECORDS (CDRs) ARE BASED ON SUBSCRIBER USAGE OBTAINED FROM MEDIATION SYSTEMS

CORRELATION OF BDR AND CDR: THE COMPLEMENTARY DATA COLLECTED FROM THE NETWORK IS THE KEY TO PREVENT REVENUE LEAKAGE DUE TO INCOMPLETE / PARTIAL DATA

NETWORK UTILIZATION COLLECTED BY MEANS OF POLLING:
 NETWORK ELEMENTS ARE INSTRUMENTED TO SEND POLL DATA AT PRE-SPECIFIED INTERVALS;
 POLLING FREQUENCY VARIES FROM ZERO (NO POLL DATA: NOTHING) TO INFINITY (EVERYTHING);
 POLLING FREQUENCY IS A TRADE-OFF BETWEEN TOO LITTLE AND TOO MUCH;

RUMs RECONSTRUCT BDR BASED ON POLL DATA:
 POLL DATA PROVIDES A GLIMPSE OF WHO UTILIZED NETWORK FOR HOW LONG AND FOR WHAT PURPOSE (SERVICE TYPES)

FIG. 4: AN APPROACH FOR REVENUE UNLEAKING

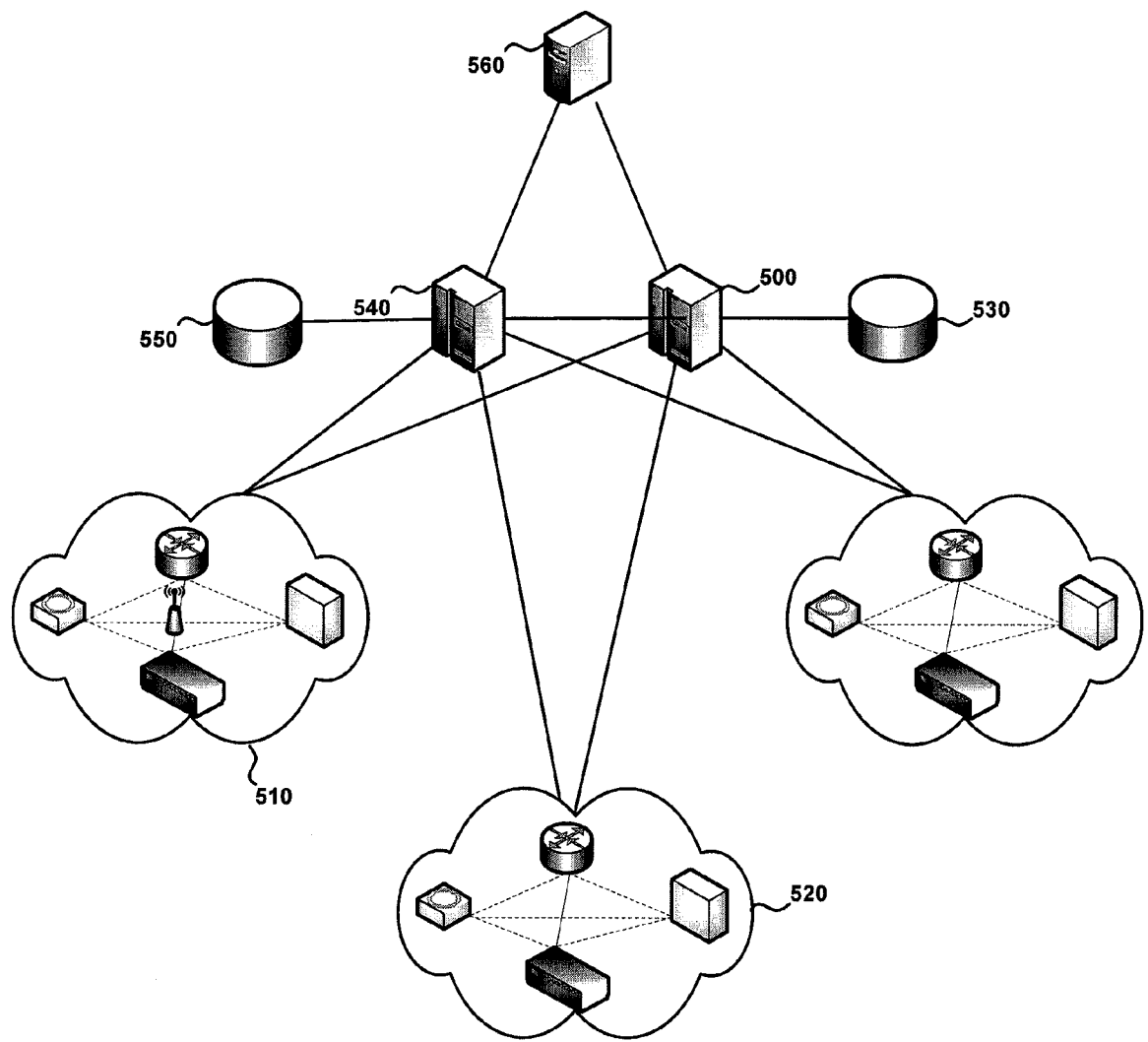
FIG. 5: OVERVIEW OF A REVENUE UNLEAK MONITORING (RUM) SYSTEM

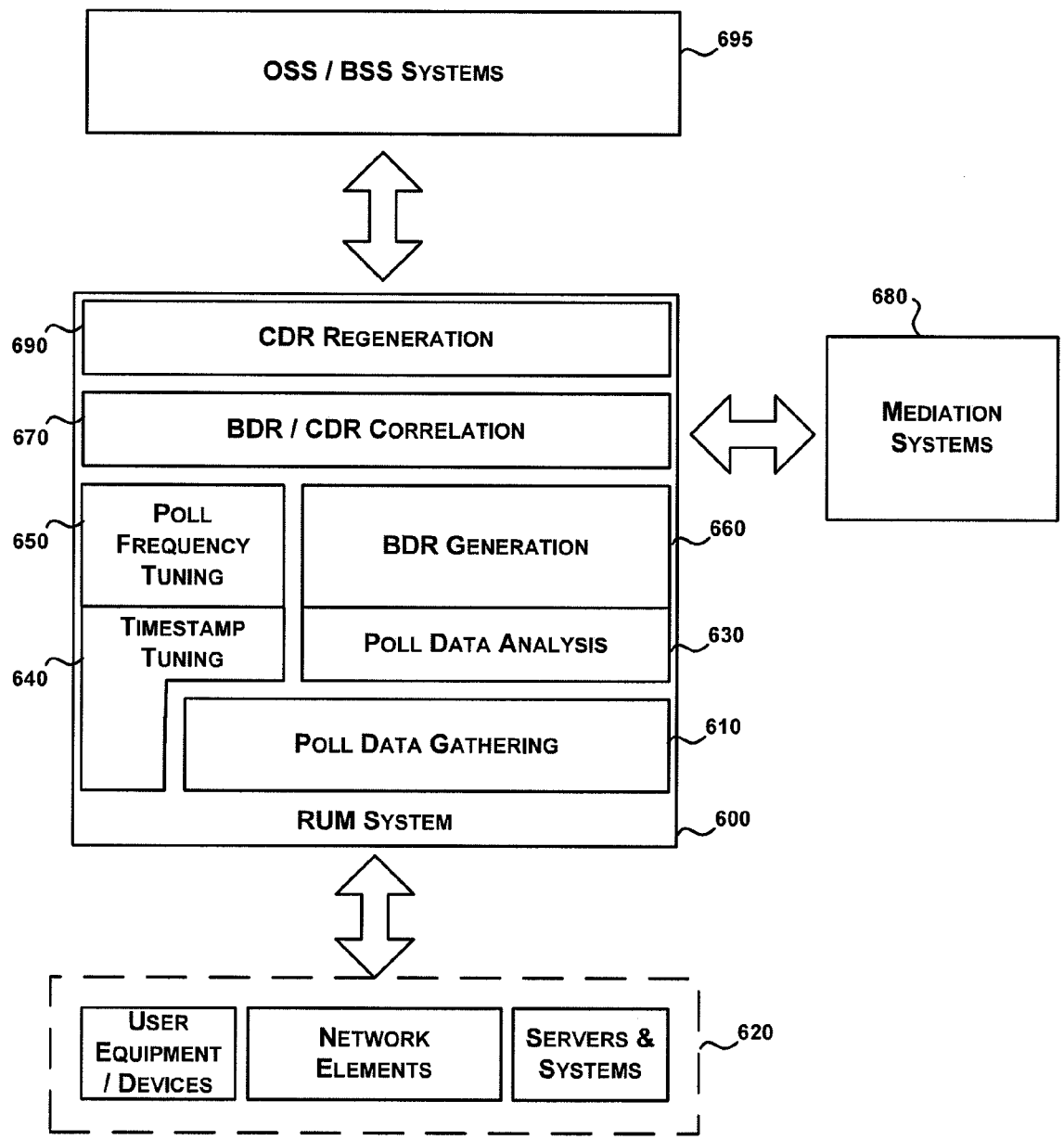
FIG. 6: OVERVIEW OF A SYSTEM ARCHITECTURE OF RUM SYSTEM

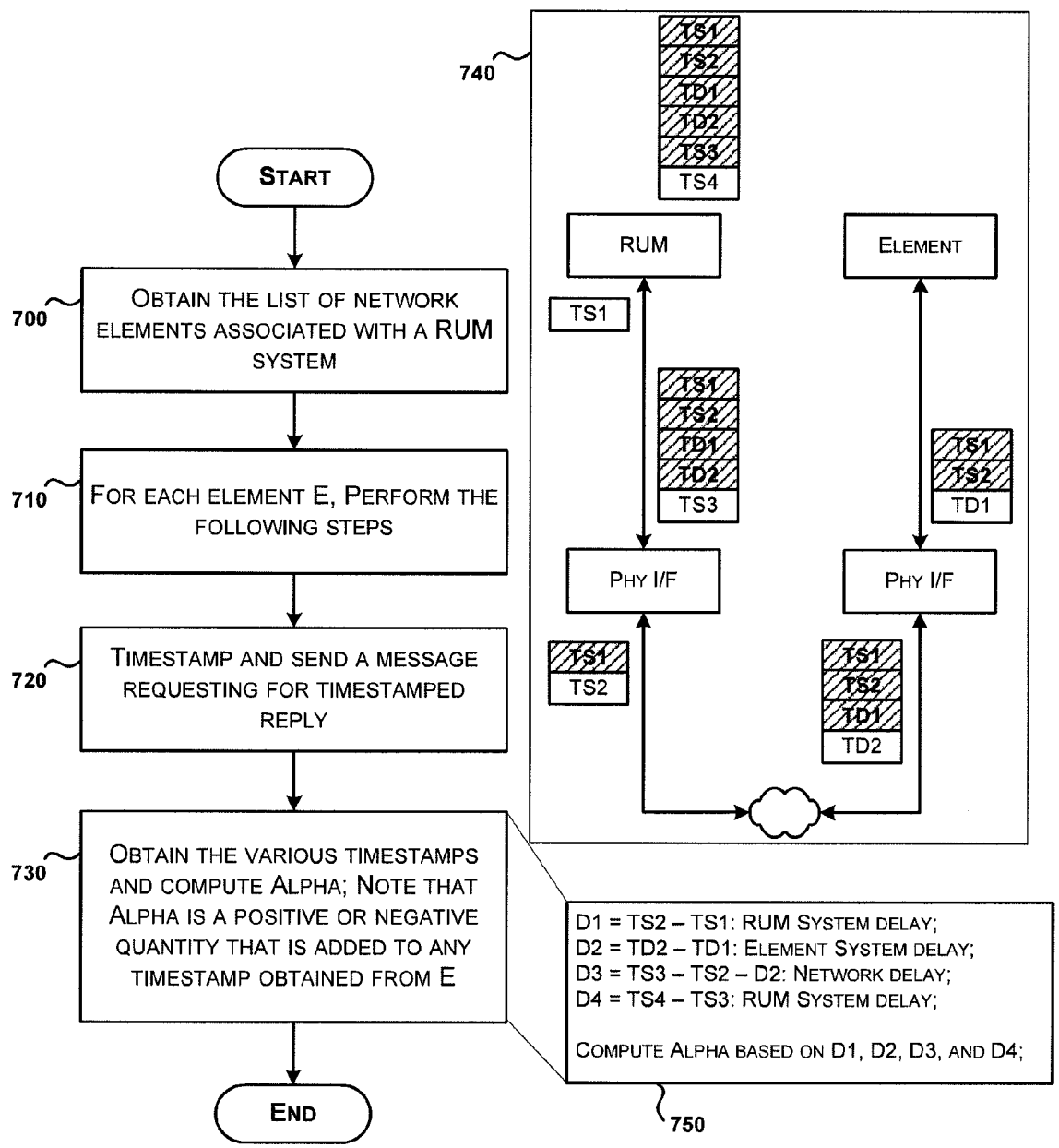
FIG. 7: TIMESTAMP TUNING

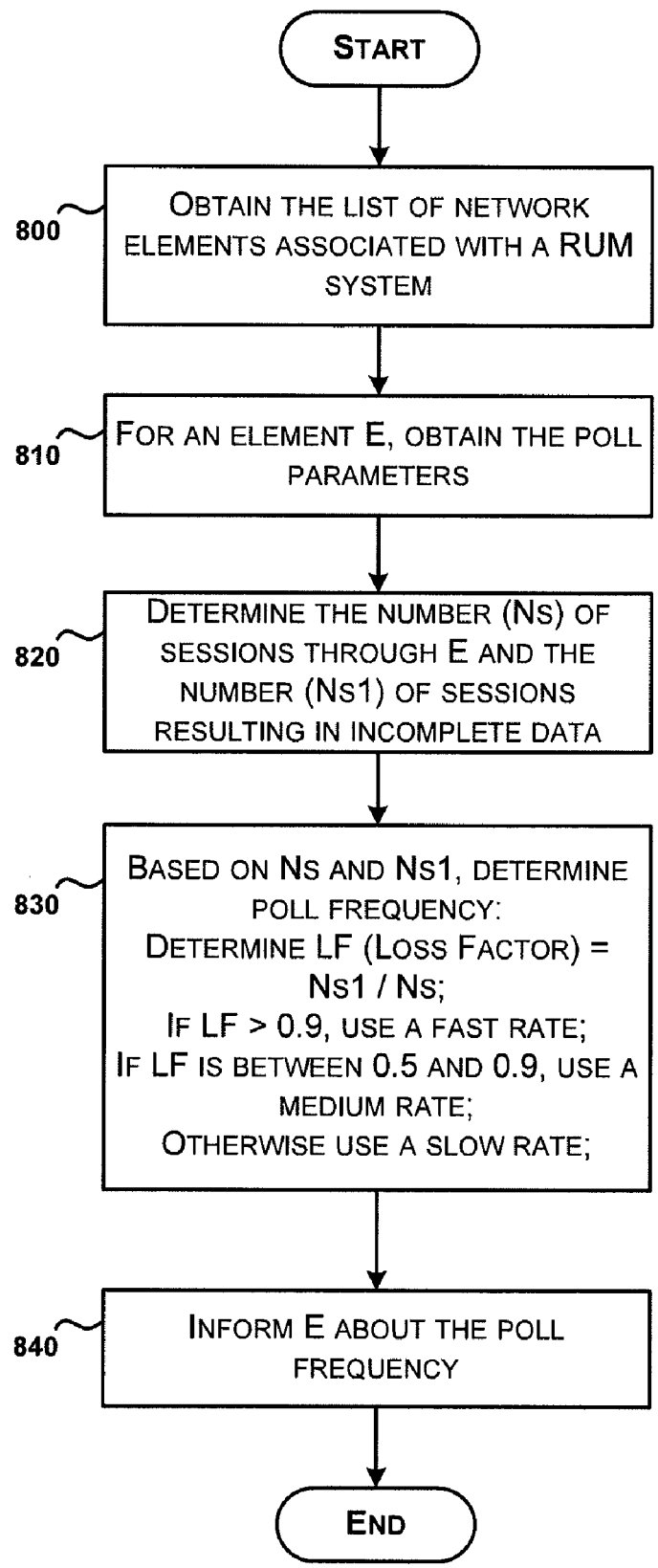
FIG. 8: POLL FREQUENCY TUNING

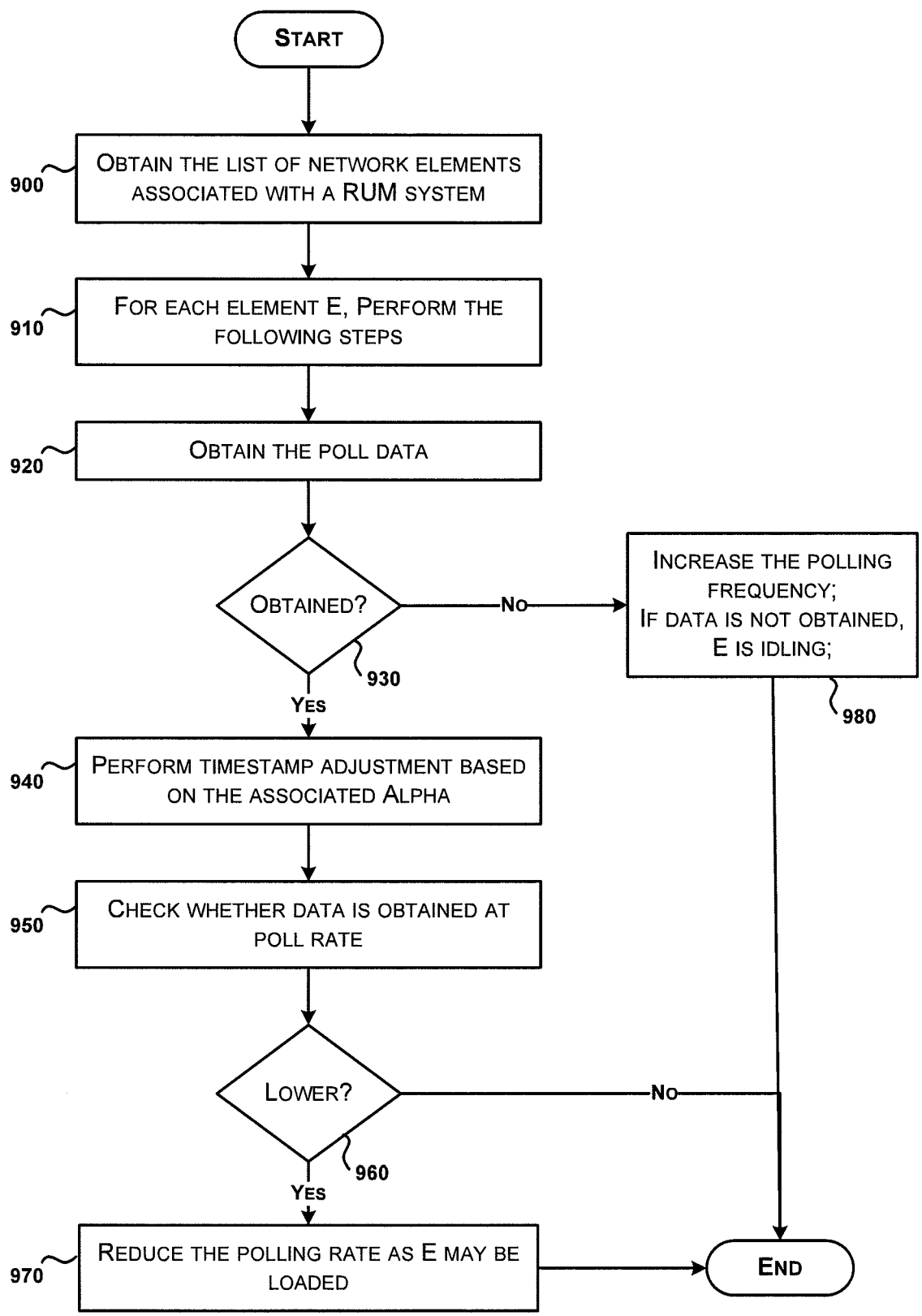
FIG. 9: POLL DATA ANALYSIS

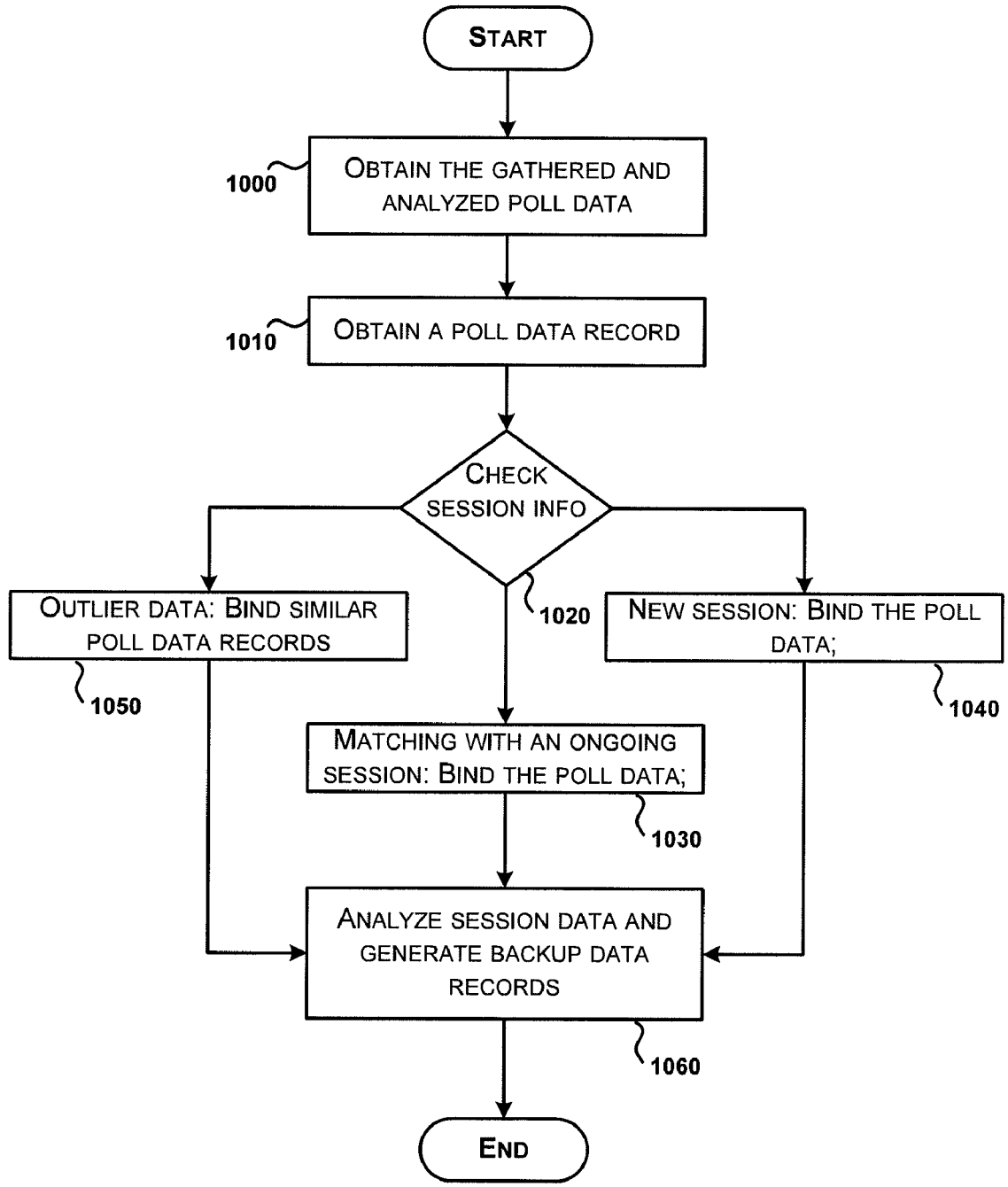
FIG. 10: SESSION IDENTIFICATION

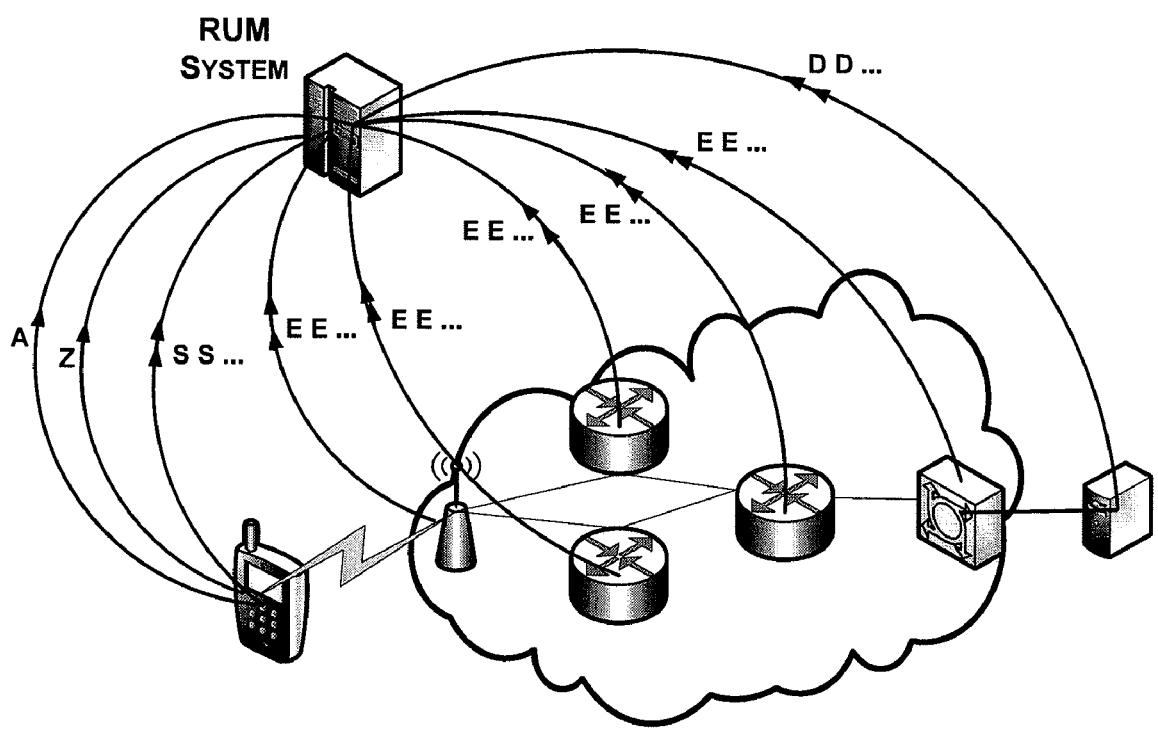
FIG. 10A: POLL DATA TYPES

| Type | A | S | E | D | Z | Remarks |
|---|---|---|---|---|---|---|
| 0 | 1 | Many | Many | Many | 1 | Full session |
| 1 | 1 | Many | Many | Many | 0 | No End info |
| 2 | 1 | Many | Many | 0 | 1 | Full session – X; No Destination info |
| 3 | 1 | Many | Many | 0 | 0 | No Destination and End info |
| 4 | 1 | Many | 0 | Many | 1 | Full session – X; No Element info |
| 5 | 1 | Many | 0 | Many | 0 | No Element and End info |
| 6 | 1 | Many | 0 | 0 | 1 | Full session – X; No Element and Destination info |
| 7 | 1 | Many | 0 | 0 | 0 | No Element, Destination, and End info |
| 8 | 1 | 0 | Many | Many | 1 | Full session – X; No Source info |
| 9 | 1 | 0 | Many | Many | 0 | No Source and End info |
| 10 | 1 | 0 | Many | 0 | 1 | Full session – X; No Source and Destination info |
| 11 | 1 | 0 | Many | 0 | 0 | No Source, Destination, and End info |
| 12 | 1 | 0 | 0 | Many | 1 | Full session – X; No Source and Element info |
| 13 | 1 | 0 | 0 | Many | 0 | No Source, Element, and End info |
| 14 | 1 | 0 | 0 | 0 | 1 | Full session – X; No Source, Element and Destination info |
| 15 | 1 | 0 | 0 | 0 | 0 | No Source, Element, Destination, and End info |

Fig. 10B: Different Types of Sessions - I

| Type | A | S | E | D | Z | Remarks |
|---|---|---|---|---|---|---|
| 16 | 0 | Many | Many | Many | 1 | No Start info |
| 17 | 0 | Many | Many | Many | 0 | No Start and End info |
| 18 | 0 | Many | Many | 0 | 1 | No Start and Destination info |
| 19 | 0 | Many | Many | 0 | 0 | No Start, Destination, and End info |
| 20 | 0 | Many | 0 | Many | 1 | No Start and Element info |
| 21 | 0 | Many | 0 | Many | 0 | No Start, Element, and End info |
| 22 | 0 | Many | 0 | 0 | 1 | No Start, Element, and Destination info |
| 23 | 0 | Many | 0 | 0 | 0 | No Start, Element, Destination, and End info |
| 24 | 0 | 0 | Many | Many | 1 | No Start and Source info |
| 25 | 0 | 0 | Many | Many | 0 | No Start, Source, and End info |
| 26 | 0 | 0 | Many | 0 | 1 | No Start, Source, and Destination info |
| 27 | 0 | 0 | Many | 0 | 0 | No Start, Source, Destination, and End info |
| 28 | 0 | 0 | 0 | Many | 1 | No Start, Source, and Element info |
| 29 | 0 | 0 | 0 | Many | 0 | No Start, Source, Element, and End info |
| 30 | 0 | 0 | 0 | 0 | 1 | No Start, Source, Element, and Destination info |
| 31 | 0 | 0 | 0 | 0 | 0 | NO INFORMATION ABOUT SESSION |

FIG. 10C: DIFFERENT TYPES OF SESSIONS - II

BDR GENERATION BASED ON DIFFERENT TYPES OF SESSIONS:

SESSION TYPES 0, 2, 4, 6, 8, 10, 12, 14 (FULL SESSION – X ):
  OBTAIN THE FULL SESSION INFORMATION;
  ENSURE THAT ALL POLL DATA ARE WITHIN THEIR POLL FREQUENCY AND ARE WITHIN A AND Z;
  COMPUTE RF AND SF;
  FORM BDR BASED ON A AND Z POLL DATA RECORDS;

SESSION TYPES 1, 3, 5, 7, 9, 11, 13, 15 (START INFO – X – NO END INFO):
  OBTAIN THE AVAILABLE SESSION INFORMATION;
  ENSURE THAT ALL POLL DATA ARE WITHIN THEIR POLL FREQUENCY AND ARE POST A;
  COMPUTE RF AND SF;
  FORM BDR BASED ON A AND THE TEMPORALLY LATEST OF THE POLL DATA;

SESSION TYPES 16, 18, 20, 22, 24, 26, 28, 30 (NO START INFO – X – END INFO)
  OBTAIN THE AVAILABLE SESSION INFORMATION;
  ENSURE THAT ALL POLL DATA ARE WITHIN THEIR POLL FREQUENCY AND ARE WITHIN Z;
  COMPUTE RF AND SF;
  FORM BDR BASED ON THE TEMPORALLY EARLIEST OF THE POLL DATA AND Z;

SESSION TYPES 17, 19, 21, 23, 25, 27, 29 (NO START – X – NO END INFO)
  OBTAIN THE AVAILABLE SESSION INFORMATION;
  COMPUTE RF AND SF;
  FORM BDR BASED ON THE TEMPORALLY EARLIEST OF THE POLL DATA AND THE TEMPORALLY LATEST OF THE POLL DATA;

FIG. 10D: BDR GENERATION

FACTORS ASSOCIATED WITH A BDR

RELIABILITY FACTOR (RF):
  A MEASURE OF HOW CONSISTENT AND ACCURATE IS THE DERIVED BDR;
  COMPUTATION IS BASED ON
    (A) POLL DATA;
    (B) CONSISTENCY WITH RESPECT TO THE VARIOUS POLL FREQUENCIES;
    (C) COVERAGE WITH RESPECT TO POLL TYPES;
    (D) WEIGHTED ASSESSMENT BASED ON POLL DATA;

RF IS A VALUE BETWEEN 0 AND 1 WITH VALUES CLOSE TO 0 INDICATING THAT NO CORRELATABLE
    CONCLUSIONS ARE POSSIBLE WHILE VALUES CLOSE TO 1 INDICATE THAT HIGHLY
    CORRELABTALE CONCLUSIONS ARE POSSIBLE;

COMPUTING RF:
    LET W1 BE THE WEIGHT ASSOCIATED WITH THE POLL TYPE A, W2 WITH S, W3 WITH E, W4 WITH D,
    AND W5 WITH Z; NOTE THAT W1 AND W5 ARE RELATIVELY MORE WEIGHTED AS COMPARED WITH
    W2, W3, AND W4;
    MEASURE DEVIATION DI IN POLL FREQUENCY FOR EACH POLL TYPE BASED ON THE ASSOCIATED POLL
    RATE; DI IS A VALUE BETWEEN 0 AND 1 WITH THE VALUE CLOSE TO 0 INDICATING TOO MUCH OF
    DEVIATION AND THE VALUE CLOSE TO 1 INDICATING A SMALLER DEVIATION; ABSENCE OF A POLL DATA
    RECORDS OF A POLL TYPE GETS A DI VALUE OF 0;
    COMPUTE RF AS W1*D1 + W2*D2 + W3*D3 + W4*D4 + W5*D5;

SHORT FACTOR (SF):
  A MEASURE OF HOW ACCURATE THE DURATION OF THE DERIVED BDR;
  COMPUTATION IS BASED ON
    (A) POLL DATA;
    (B) THE MOST CONSISTENT POLL FREQUENCY;
    (C) THE IMPORTANCE OF THE VARIOUS POLL TYPES;

SF IS A VALUE DEPICTING THE EXPECTED VARIANCE IN THE BDR DURATION DURING CORRELATION, AND
  IS A VALUE BETWEEN 0 AND 1 WITH THE VALUE CLOSE TO 0 INDICATING HIGHER VARIANCE AND THE
  VALUE TO CLOSER TO 1 INDICATING LOWER VARIANCE;

COMPUTING SF:
    IF A AND Z POLL DATA ARE PRESENT, THEN SET SF TO 1;
    IF A AND D ARE PRESENT, AND TIMESTAMP OF THE LAST D POLL DATA IS THE LATEST AMONG ALL OF
    THE POLL DATA, THEN SET SF TO 0.8;
    IF A AND D ARE PRESENT, AND TIMESTAMP OF THE LAST D POLL DATA IS CLOSE TO THE LATEST
    AMONG ALL OF THE POLL DATA, THEN SET SF TO 0.6;
    IF D AND Z ARE PRESENT, AND TIMESTAMP OF THE FIRST D POLL DATA IS CLOSE TO THE FIRST POLL
    DATA OF ANY TYPE, THEN SET SF TO 0.6;
    IF D IS PRESENT, AND TIMESTAMP OF THE FIRST D POLL DATA IS CLOSE TO FIRST POLL DATA OF ANY
    TYPE, AND TIMESTAMP OF LAST D POLL DATA IS CLOSE TO THE LATEST AMONG ALL OF THE POLL
    DATA, THEN SET SF TO 0.4;
    IF A AND E ARE PRESENT WITH A GOOD SET OF E POLL DATA, THEN SET SF TO 0.2;
    IF Z AND E ARE PRESENT WITH A GOOD SET OF E POLL DATA, THEN SET SF TO 0.2;
    ELSE, SET SF TO 0.1;

FIG. 10E: COMPUTING OF FACTORS ASSOCIATED WITH A BDR

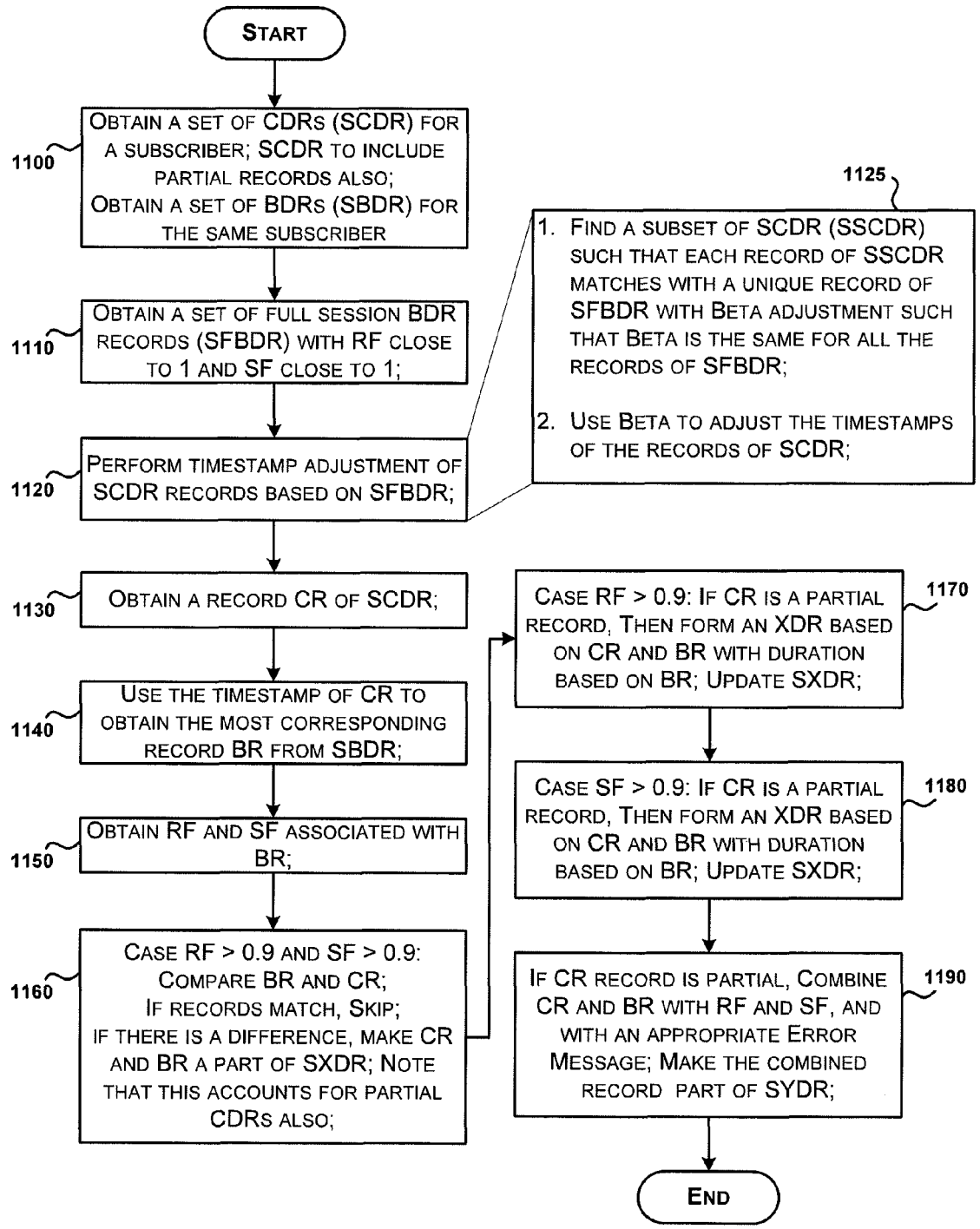
FIG. 11: CORRELATING BDRs AND CDRs

SYSTEM AND METHOD FOR REVENUE UNLEAKING

FIELD OF THE INVENTION

The present invention relates to revenue analysis of telecom operators in general, and more particularly, analysis of revenue leakage. Still more particularly, the present invention is related to a system and method for revenue leakage management due to incomplete/partial data.

BACKGROUND OF THE INVENTION

Revenue assurance is an important activity of the operational support of telcos. The revenue assurance helps in achieving the best profit margins, addressing the regulatory demands, and ensuring that what is delivered gets billed. Revenue leakage is simply stated as the amount not collected for the services delivered, and hence, revenue assurance aims at reducing the revenue leakage to close to zero. Industry experts and the various surveys tend to indicate that the telcos lose, on a very modest note, about 3% to 5% of their revenues due to leakage. Typically, working towards containing revenue leakage is a complex task demanding huge effort and can be quite expensive as well. The primary reasons for the revenue leak are (a) frauds—lead to misuse of the telco infrastructure and the services utilized are either partially billed or none at all; (b) data loss—leads to non-availability of adequate information to bill for the delivered services; (c) low utilization—due to the inefficient usage of telco infrastructure; and (d) inefficient processes—leading to delayed collection and churn. While each one of the reasons given above requires an exclusive technique to contain the leakage, one that stands out is the loss of data: it is impossible to bill and collect if the data itself is not available, and this poses a threat to telcos as data loss directly means revenue loss. Any solution that addresses revenue leakage due to data loss would go a long in way in helping telcos in containing revenue leakage and managing revenue assurance.

DESCRIPTION OF RELATED ART

U.S. Pat. No. 7,469,341 to Edgett; Jeff Steven (Sunnyvale, Calif.), Sunder; Singam (San Jose, Calif.) for "Method and system for associating a plurality of transaction data records generated in a service access system" (issued on Dec. 23, 2008 and assigned to iPAss Inc. (Redwood Shores, Calif.)) describes a system for generating a transaction record along with a unique session identification for say, billing purposes.

U.S. Pat. No. 7,440,557 to Gunderman, Jr.; Robert Dale (Honeoye Falls, N.Y.) for "System and method for auditing a communications bill" (issued on Oct. 21, 2008 and assigned to GND Engineering, PLLC) describes a system for auditing a communication bill wherein billing information is collected and further collects data from other external sources such as a work order system, a trouble ticket system, an inventory system, an SS7 event record data source for auditing purposes.

U.S. Pat. No. 7,436,942 to Hakala; Harri (Turku, F I), Lundstrom; Johan (Pargas, F I), Teppo; Patrik (Jamsjo, S E) for "System and method for charging in a communication network" (issued on Oct. 14, 2008 and assigned to Telefonaktiebolaget L M Ericsson (publ) (Stockholm, S E)) describes a system for charging in a communication network especially in an IP Multimedia network.

U.S. Pat. No. 6,928,150 to Johnston; Alan Bernard (St. Louis, Mo.) for "Call charging notification" (issued on Aug. 9, 2005 and assigned to MCI, Inc. (Ashburn, Va.)) describes an approach for providing information of a call established over a data network in which a network element that assists in establishing the call forwards the information about the call for charging purposes.

U.S. Pat. No. 6,721,405 to Nolting; Thomas A. (Holliston, Mass.), Dion; Karen (Dudley, Mass.) for "Interconnect traffic analysis" (issued on Apr. 13, 2004 and assigned to Verizon Services Corp. (Arlington, Va.)) describes a system that captures call related messages produced by a network and compiles data to form call detail records for the interconnect traffic.

U.S. Pat. Application No. 20080301018 by Fine; Jack; (Benicia, Calif.); Deshong; Elizabeth; (San Ramon, Calif.); Lim; Marie Jennifer; (San Ramon, Calif.); Kim; Ailene; (Livermore, Calif.); Legro; Euly; (Benicia, Calif.); Kumar; Senthil; (San Ramon, Calif.) titled "Revenue Assurance Tool" (published on Dec. 4, 2008 and assigned to AT & T Knowledge Ventures, L. P. (Reno, Nev.)) describes a system that assures revenue reconciliation of customer billing and vendor settlements for multimedia services based on data collected from multiple network elements in the network.

U.S. Pat. Application No. 20080056144 by Hutchinson; Jeffrey; (Renton, Wash.); Mckinlay; David B.; (Maple Valley, Wash.) titled "System and method for analyzing and tracking communications network operations" (published on Mar. 6, 2008 and assigned to Cypheredge Technologies (Bellevue, Wash.)) describes a system for monitoring network performance that includes a data collection system for obtaining data form event data records provided by the network.

U.S. Pat. Application no. 20070207774 by Hutchinson; Jeffrey; (Renton, Wash.); Paulsen; Christopher D.; (Seattle, Wash.) titled "System for compiling data from call event information" (published on Sep. 6, 2007) describes a system for extracting event data for a wireless network communications provider that includes a mediation platform that receives event records containing event data.

U.S. Pat. Application No. 20070036309 by Zoldi; Scott M.; (San Diego, Calif.); Balon; Michael P.; (San Diego, Calif.) titled "Network assurance analytic system" (published on Feb. 15, 2007) describes a network assurance analytics that is configured to monitor telecommunication networks, detect errors or frauds, and provide solutions to resolve the errors or reduce the fraud.

U.S. Pat. Application No. 20060206941 by Collins; Simon Christopher; (Chippenham, GB) titled "Communications system with distributed risk management" (published on Sep. 14, 2006 and assigned to Praesidium Technologies, Ltd.) describes a system aimed at improved risk management for detection of fraud, protection of revenue, and other risk management controls.

"Global Assurance Survey—Taking revenue assurance to the next level" by Ernst & Young (Presentation, May 8, 2008) describes that most revenue assurance functions continue to focus on revenue leakage.

"Revenue Assurance Stops the Leak" by Shira Levine and Lorien Pratt (appeared in Telecommunications Online, Oct. 1, 2005) describes the complexities of revenue assurance in next generation networks.

"Mobile Content Revenue Leakage: There's a Hole in the Bucket" by iGilliot Research (White Paper, September 2005) describes the size and complexity of revenue leakage especially in the context of wireless networks.

"Mediation Systems Halt Revenue Leakage" by John L. Guerra (appeared in B/OSS—Billing and OSS World, Apr. 1, 2005) describes the ever expanding role of mediation systems in managing telecom networks.

The known systems are largely event based and do not explicitly address the various issues related to the containing of revenue leakage due to data loss. The present invention provides a system and method to comprehensively address this problem of revenue leakage by tapping onto complementary data sources and tracking telco infrastructure utilization.

SUMMARY OF THE INVENTION

The primary objective of the invention is to plug revenue leakage in telcos due to data loss.

One aspect of the invention is to bring in a subscriber perspective to the revenue leakage.

Another aspect of the invention is to bring in a network perspective to the revenue leakage.

Yet another aspect of the invention is to collect complementary data based on subscriber usage and network usage.

Another aspect of the invention is to achieve a four-way reconciliation: source and destination, intermediate network elements, and mediation data.

Yet another aspect of the invention is to generate backup data records based on network usage data.

Another aspect of the invention is to correlate call data records and backup data records to handle partial data records due to data loss.

Yet another aspect of the invention is to obtain complementary data through multiple poll records based on multiple poll types.

Another aspect of the invention is to perform timestamp tuning of the various network elements.

Yet another aspect of the invention is to perform poll frequency tuning with respect to the various network elements.

BRIEF DESCRIPTION OF THE DRAWINGS

FIG. 1 depicts an Overview of a Mediation System.
FIG. 2 depicts typical aspects of Revenue Leakage.
FIG. 3 depicts a critical Revenue Leakage Factor.
FIG. 4 provides an Approach for Revenue Unleaking.
FIG. 5 provides an overview of a Revenue Unleak Monitoring (RUM) System.
FIG. 6 provides an overview of a System Architecture of RUM System.
FIG. 7 provides an approach for Timestamp Tuning.
FIG. 8 provides an approach for Poll Frequency Tuning.
FIG. 9 provides an approach for Poll Data Analysis.
FIG. 10 provides an approach for Session Identification.
FIG. 10*a* provides an overview of Poll Data Types.
FIG. 10*b* depicts different Types of Sessions.
FIG. 10*c* depicts additional different Types of Sessions.
FIG. 10*d* provides an approach for BDR Generation.
FIG. 10*e* provides an approach for computing of Factors associated with a BDR.
FIG. 11 provides an approach for correlating BDRs and CDRs.

DETAILED DESCRIPTION OF THE PREFERRED EMBODIMENTS

It is not uncommon to hear that a call detail record is incorrectly recorded by a billing system. There are several reasons why such a situation crops up more often leading to a noticeable revenue loss for telco operators. Incomplete usage information arises due to several reasons such as network configuration problems and provisioning glitches. Another reason is due the way the telecom companies have grown through mergers and acquisitions leading to shortfalls in billing information consolidation. To take a grip on this, carriers have entire revenue assurance departments to address revenue leakages. Mediation systems that are part of telco infrastructure are positioned to gather and deliver information for an operating support system, and this information forms an input for billing. Mediation systems gather information from network elements based on events, and the main challenge is how to reduce the revenue leakage in general and specifically, due to data loss.

FIG. 1 depicts an overview of a Mediation System. A mediation system (100) gathers information the entire of the networking infrastructure such as wireless networks (110) and fixed networks (120). Typically, the gathered information is based on a set of events that happen during a session (call) setup and session (call) close. This event driven information gets stored in a database (130) and this is expected to comprehensively denote the subscriber usage data. The processed and formatted information is sent to the OSS/BSS (operations/business support system) system at appropriate intervals for billing purposes.

FIG. 2 depicts typical aspects of Revenue Leakage. Largely, revenue leakage is attributed as due to one or more of the following:

1. Frauds—Identity theft, Handset instrumentation, Pre-paid and Post-paid frauds, . . . .
2. Data loss—Systems, Network elements, Links, Incorrect/ Incomplete data, . . . .
3. Utilization—Poorly optimized call routing, Mismatched configuration, Unscheduled maintenance, . . . .
4. Collection—Inadequate credit management, churn, . . . .

The revenue leakage is analyzed from multiple perspectives:

1. Subscribers—Initiate sessions that result in billing
2. Networks—Transport subscriber sessions
3. Policies—Enforce subscriber price plans and billing guidelines
4. Regions—Region-wise analysis of billing and revenue loss A typical approach for Revenue Assurance is as follows:
1. Mediation systems to collect subscriber usage data
2. Creating of data based on call events obtained from network collection points: Match data obtained during the call setup, obtain the second half of the call, and combine the data into a single call data
3. Signaling records to provide signaling messages associated with subscriber sessions
4. Correlation of multiple parts of a call data record and across multiple data sources
5. Session records are to be obtained for a variety of services offered by a provider such as VOIP calls, Text messages, Multimedia messages, Emails, Ring tones, Browsing sessions, MP3 downloads, traditional and wireless calls, Events and notifications, and location based services.

FIG. 3 depicts a critical Revenue Leakage Factor. A critical factor in Revenue Unleaking is to address data loss especially involving incomplete/partial data. The inability to generate a valid data record for billing leads to the loss of collection points and leads to revenue leak.

Some reasons for the generation of partial data include
(a) Session gets interrupted through a dropped connection;
(b) Incorrectness due to inconsistent timestamping;
(c) Inconsistency due to too much of difference in timestamps;
(d) Inconsistency due to mismatch in identifier details;
(e) Missing start/end data;
(f) Failure in a network element;
(g) Inconsistent configuration;

(h) Inadvertent configuration changes;
(i) Internal buffer overflow in a system or a network element; and
(j) Inadvertent brining down of a system or a network element for maintenance.

FIG. 4 provides an Approach for Revenue Unleaking.

An Approach for Revenue Unleaking:
(a) A collection of RUM (Revenue Unleak Monitoring) systems are distributed throughout the network; The RUM systems are configured to receive data from the network elements at pre-defined time intervals. The objective is to obtain complementary data from the network and systems so that any incomplete/partial data gets handled in the most appropriate manner.
(b) RUM systems receive poll data from network elements:
PollType (A|Z|S|E|D)
Timestamp (Element)
Address (Source, Destination, Element)
In order to be able to address dynamic and transient network and system conditions, a session is identified with different poll types: A standing for polled data from the source element of the session; Z for the polled data from the source element of the session; S again for the polled data from the source element of the session; E for the polled data from the network elements that carry session traffic; and D for the polled data from the destination element. The address helps in identifying all of poll data related to a session and timestamp helps in correlation with CDRs (call data records).
(c) Four-way reconciliation:
Subscriber Terminals and/or Servers
Network elements
Call data records (generated by Mediation systems)
The obtained poll data provides adequate information for achieving the necessary reconciliation to address the issues related to incomplete/partial data.
(d) Backup Data Records (BDRs) are derived based on network utilization from RUM Systems; The BDRs are generated based on the poll data associated with each session and handles the specific cases involving missing poll data records of certain poll types.
(e) Call data records (CDRs) are based on subscriber usage obtained from Mediation Systems
(f) Correlation of BDR and CDR: The complementary data collected from the network is the key to prevent revenue leakage due to incomplete/partial data.
(g) Network utilization collected by means of polling:
Network elements are instrumented to send poll data at pre-specified intervals;
Polling frequency varies from zero (No poll data: NOTHING) to Infinity (EVERYTHING);
Polling frequency is a trade-off between too little and too much;
(h) RUMs reconstruct BDR based on poll data:
Poll data provides a glimpse of who utilized network for how long and for what purpose (service types);

FIG. 5 provides an overview of a Revenue Unleak Monitoring (RUM) System. There two kinds of systems, Mediation system and RUM system, to help gather complementary data records. Mediation system (500) collects call data records or equivalent records for the services over IP network based on the events generated by various networks (510 and 520). The collected data stored in a database (530) depicts the subscriber usage data. On the other hand, the RUM system (540) gathers poll data from the various networks (510 and 520) and stores the collected data in a database (550). This collected depicts the extent of network utilization. The RUM system generates the appropriate BDRs and correlates the same with CDRs to finally help regenerate CDRs to plug in as much of revenue leak due to data loss as possible. The OSS/BSS system (560) generates billing data based on the regenerated CDRs.

FIG. 6 provides an overview of a System Architecture of RUM System. The RUM System is a distributed system with several RUM systems distributed throughout an operator's network. In a particular embodiment, a RUM system (600) has the following subsystems: (a) Poll data gathering (610) receives poll data of various poll types from the various network elements such as user equipment/devices, network elements, and servers/systems (620); (b) Poll data analysis (630) analyses the received poll data to determine any inconsistency and the analysis also makes use of the configured poll frequency of the various network elements; (c) Timestamp tuning (640) to help in the appropriate combining of the poll data records related to a session; (d) Poll frequency tuning (650) to help set the appropriate poll frequency for the various network elements (e) BDR Generation (660) to help generate BDRs based on poll data records; (f) BDR/CDR Correlation (670) to receive CDRs from a mediation system (680) and correlated the same with respect to the generated BDRs; and (g) CDR Regeneration (690) regenerates the CDRs to be processed by OSS/BSS system (695).

FIG. 7 provides an approach for Timestamp Tuning. Obtain the list of network elements associated with a RUM system (700). For each element E, Perform the following steps (710). Timestamp a message and send the message requesting for timestamped reply (720) from the network element E. The objective is to be able to calibrate the timestamps of the poll data records received from the various network elements. In order to construct a BDR, it is required that all the poll data records are appropriately calibrated and this is achieved by readjusting the timestamps of the poll records based on the timestamp of the RUM system. Obtain the various timestamps and compute Alpha (730); Note that Alpha is a positive or negative quantity that is added to any timestamp obtained from E. An illustrative list of various timestamps are depicted in 740 and 750 illustrates an approach for Alpha computation:
D1=TS2−TS1: RUM System delay;
D2=TD2−TD1: Element System delay;
D3=TS3−TS2−D2: Network delay;
D4=TS4−TS3: RUM System delay;
Compute Alpha based on D1, D2, D3, and D4.

FIG. 8 provides an approach for Poll Frequency Tuning. Obtain the list of network elements associated with a RUM system (800). For an element E, obtain the poll parameters (810). Determine the number (Ns) of sessions through E and the number (Ns1) of sessions resulting in incomplete data (820). Based on Ns and Ns1, determine poll frequency (830):
Determine LF (Loss Factor)=Ns1/Ns;
If LF>0.9, use a fast rate;
If LF is between 0.5 and 0.9, use a medium rate;
Otherwise use a slow rate;
Inform E about the poll frequency (840).

FIG. 9 provides an approach for Poll Data Analysis. Obtain the list of network elements associated with a RUM system (900). For each element E, Perform the following steps (910). Obtain the poll data (920). If data is obtained (930), Perform timestamp adjustment based on the associated Alpha (940). Check whether data is obtained at poll rate (950). If lower (960), Reduce the polling rate as E may be loaded (970). If data is not obtained within the expected poll rate (930), Increase the polling frequency (980); If still data is not obtained, E is idling.

FIG. 10 provides an approach for Session Identification. Obtain the gathered and analyzed poll data (1000). Obtain a poll data record (1010). Check the session information (1020). If the session information matches with an ongoing session (1030), bind the poll data record with the corresponding session. Else, if the session information indicates the beginning of a new session, start a new session and bind the poll data (1040). Otherwise, the poll data is an outlier data (1050) and bind similar poll data records. Perform the analysis the poll data records and generate backup data records (1060).

FIG. 10*a* provides an overview of Poll Data Types. There are five different types of poll data records: (a) Poll type A is a polled data obtained at a RUM system from a source element, say, a user equipment; This data is sent once at the beginning of a session; (b) Poll type S is a polled data obtained at a RUM system from a source element, say, a user equipment; this data is sent a regular intervals at the pre-specified poll frequency until the end of the session; (c) Poll type E is a polled data obtained at a RUM system from a network element; The network element carries the session traffic and the polled data is sent at regular intervals at the pre-specified poll frequency until the end of the session; (d) Poll type D is a polled data obtained at a RUM system from a destination element, say, a user equipment or a destination system; the polled data is sent at regular intervals at the pre-specified poll frequency until the end of the session; and (e) Poll type Z is a polled data obtained at a RUM system from a source element, say, user equipment, once at the end of the session.

FIG. 10*b* depicts different Types of Sessions. The different types of sessions arise due to the varying nature of the network conditions. When the network conditions are stable, all poll data records of different poll types are received properly based on the poll frequencies at a RUM system. This is depicted in Session Type 0. Based on the network conditions, some of the poll data records may not be received. For instance, the Session Type 1 depicts the missing of the poll data record of type Z, and the Session Type 12 indicates the missing of poll data records of types S and E. Note that a full session is depicted by session types such as 0, 2, 4, 6, 8, 10, 12, or 14, wherein at least both poll data records of type A and Z are present.

FIG. 10*c* depicts additional different Types of Sessions.

FIG. 10*d* provides an approach for BDR Generation. The generation backup data records (BDRs) is based on the various poll data records obtained with respect to a session. There are four different classes of session types: (a) FULL SESSION—X: this class is characterized by the availability of at least both poll data records of type A and Z; (b) START INFO—X—NO END INFO: this class is characterized by the availability of the poll data record of type A and the absence of the poll data record of type Z; NO START INFO—X—END INFO: this class is characterized b the absence of the poll data record of type A and the availability of the poll data record of type Z; and (d) NO START INFO—X—NO END INFO: this class characterizes the remaining of the session types wherein a session of this class is characterized by the absence of both poll data records of types A and Z.

BDR Generation based on different types of sessions is as follows:

Session Types 0, 2, 4, 6, 8, 10, 12, 14 (FULL SESSION—X):
  Obtain the full session information;
  Ensure that all poll data are within their poll frequency and are within A and Z;
  Compute RF and SF;
  Form BDR based on A and Z poll data records;

Session Types 1, 3, 5, 7, 9, 11, 13, 15 (START INFO—X—NO END INFO):
  Obtain the available session information;
  Ensure that all poll data are within their poll frequency and are post A;
  Compute RF and SF;
  Form BDR based on A and the temporally latest of the poll data;

Session Types 16, 18, 20, 22, 24, 26, 28, 30 (NO START INFO—X—END INFO)
  Obtain the available session information;
  Ensure that all poll data are within their poll frequency and are within Z;
  Compute RF and SF;
  Form BDR based on the temporally earliest of the poll data and Z;

Session Types 17, 19, 21, 23, 25, 27, 29 (No Start—x—No End info)
  Obtain the available session information;
  Compute RF and SF;
  Form BDR based on the temporally earliest of the poll data and the temporally latest of the poll data;

Note that the above approach of the generation of BDRs makes use of two factors: RF, a reliability factor and SF a short factor. These two factors together provide the most appropriate characterization of a session for correlation purposes.

FIG. 10*e* provides an approach for computing of Factors associated with a BDR. An approach for computing of factors associated with a BDR is given below. Reliability Factor (RF):
  A measure of how consistent and accurate is the derived BDR;
  Computation is based on
    (a) Poll data;
    (b) Consistency with respect to the various poll frequencies;
    (c) Coverage with respect to poll types;
    (d) Weighted assessment based on poll data;
  RF is a value between 0 and 1 with values close to 0 indicating that no correlatable conclusions are possible while values close to 1 indicate that highly correlatable conclusions are possible;
  Computing RF:
    Let W1 be the weight associated with the poll type A, W2 with S, W3 with E, W4 with D, and W5 with Z; Note that W1 and W5 are relatively more weighted as compared with W2, W3, and W4;
    Measure deviation Di in poll frequency for each poll type based on the associated Poll rate; Di is a value between 0 and 1 with the value close to 0 indicating too much of deviation and the value close to 1 indicating a smaller deviation; Absence of a poll data records of a poll type gets a Di value of 0;
    Compute RF as $W1*D1+W2*D2+W3*D3+W4*D4+W5*D5$;
  Short Factor (SF):
  A measure of how accurate the duration of the derived BDR;
  Computation is based on
    (a) Poll data;
    (b) The most consistent poll frequency;
    (c) The importance of the various poll types;
  SF is a value depicting the expected variance in the BDR duration during correlation, and is a value between 0 and 1 with the value close to 0 indicating higher variance and the value to closer to 1 indicating lower variance;

Computing SF:
An approach for computing of SF is to use a set of rules associated with the poll data. That is, the rules provide logic about how to compute SF under various characteristics of the poll data such as poll data of poll type A missing. The poll data is analyzed with respect to the various poll types to arrive a set of distributions that characterizes the poll data. Then, SF is computed by applying of the set of rules based on the set of distributions.

If A and Z poll data are present, then Set SF to 1;
If A and D are present, and timestamp of the last D poll data is the latest among all of the poll data, Then Set SF to 0.8;
If A and D are present, and timestamp of the last D poll data is close to the latest among all of the poll data, Then Set SF to 0.6;
If D and Z are present, and timestamp of the first D poll data is close to the first poll data of any type, Then Set SF to 0.6;
If D is present, and timestamp of the first D poll data is close to first poll data of any type, and timestamp of last D poll data is close to the latest among all of the poll data, Then Set SF to 0.4;
If A and E are present with a good set of E poll data, Then Set SF to 0.2;
If Z and E are present with a good set of E poll data, Then Set SF to 0.2;
Else, Set SF to 0.1;

FIG. 11 provides an approach for correlating BDRs and CDRs.

Obtain a set of CDRs (SCDR) for a subscriber and the set SCDR to include partial records also (1100). Obtain a set of BDRs (SBDR) for the same subscriber. Obtain a set of full session BDR records (SFBDR) with RF close to 1 and SF close to 1 (1110). These records are highly correlatable with the corresponding CDRs by virtue of both RF and SF being close to 1. Perform timestamp adjustment of SCDR records based on SFBDR (1120). Note that this step is essential due to the possibly dissimilar timestamp adjustments by mediation systems and RUM systems. The timestamp adjustment procedure is as follows: (1) Find a subset of SCDR (SSCDR) such that each record of SSCDR matches with a unique record of SFBDR with Beta adjustment such that Beta is the same for all the records of SFBDR; and (2) Use Beta to adjust the timestamps of the records of SCDR.

Obtain a record CR of SCDR (1130). Use the timestamp of CR to obtain the most corresponding record BR from SBDR (1140). Obtain RF and SF associated with BR (1150).

Case RF>0.9 and SF>0.9 (1160):
Compare BR and CR;
If records match, Skip;
If there is a difference, make CR and BR a part of SXDR;
Note that this accounts for partial CDRs also;
Case RF>0.9 (1170):
If CR is a partial record, Then form an XDR based on CR and BR with duration based on BR; Update SXDR;
Case SF>0.9 (1180):
If CR is a partial record, Then form an XDR based on CR and BR with duration based on BR; Update SXDR;
If CR record is partial, Combine CR and BR with RF and SF, and with an appropriate Error Message (1190). Make the combined record part of SYDR.

Note that above approach of correlation makes the appropriate use of RF and SF associated with BDRs. Observe that the best case of recovering from a data loss is when CDR record is partial and the corresponding BDR has SF and RF close to 1.

Also, note that CDR records as used in the embodiment description relate to conventional call data records related to voice based services, IP data records related to IP based services, and any other record format generated and used for billing purposes.

Thus, a system and method for revenue unleaking is disclosed. Although the present invention has been described particularly with reference to the figures, it will be apparent to one of the ordinary skill in the art that the present invention may appear in any number of systems that need the generation of complementary data and correlation of the same with the original data for reconciliation purposes. It is further contemplated that many changes and modifications may be made by one of ordinary skill in the art without departing from the spirit and scope of the present invention.

What is claimed is:

1. A method for reducing a revenue leakage in an operator network to enhance the billability based on a plurality of call data records over a plurality of sessions associated with a plurality of subscribers, wherein said revenue leakage is due to a data loss in said operator network and said plurality of call data records includes a plurality of partial call data records, wherein said plurality of partial call data records is due to said data loss, said method comprising:

obtaining of a plurality of user devices of said operator network;
obtaining of a plurality of network elements of said operator network;
obtaining of a plurality of systems of said operator network;
obtaining of a plurality of elements of said operator network, wherein said plurality of elements comprises said plurality of user devices, said plurality network elements, and said plurality of systems;
performing of timestamp tuning of said plurality of elements resulting in a plurality of alpha adjustments;
performing of poll frequency tuning of said plurality of elements;
obtaining of a plurality of poll data types, wherein said plurality of poll data types comprises a poll type A, a poll type S, a poll type E, a poll type D, and a poll type Z, wherein
said poll type A corresponds with a poll data record from a user device of said plurality of user devices, and said poll data record indicates the beginning of a session,
said poll type S corresponds with a plurality of poll data records from a user device of said plurality of user devices,
said poll type E corresponds with a plurality of poll data records from a network element of said plurality of network elements,
said poll type D corresponds with a plurality of poll data records from a user device of said plurality of user devices or a system of said plurality of systems,
said poll type Z corresponds with a poll data record from a user device of said plurality of user devices, and said poll data record indicates the end of a session;
obtaining of a plurality of poll data records from said plurality of elements, wherein a poll data record of said plurality of data records comprises a poll type, a timestamp, a source address, a destination address, and an element address, wherein said poll type is a part of said plurality of poll data types;

analyzing of said plurality of poll data records resulting in a plurality of session-wise data records;
generating of a plurality of backup data records based on said plurality of session-wise data records; and
correlating of said plurality of backup data records with said plurality of call data records to complete as much of said plurality of partial call data records as possible resulting a plurality of regenerated call data records.

2. The method of claim 1, wherein said method of performing of timestamp tuning further comprising:
obtaining of an element of said plurality of elements;
generating of a message to be sent to said element;
timestamping of said message with a timestamp 1 at the application layer;
timestamping of said message with a timestamp 2 at the physical interface layer;
sending of said message to said element;
timestamping of said message with a timestamp 3 at the physical interface layer of said element on receiving of said message;
timestamping of said message with a timestamp 4 at the physical interface layer of said element on about to be sending of said message;
timestamping of said message with a timestamp 5 at the physical interface layer on receiving of said message;
timestamping of said message with a timestamp 6 at the application layer on receiving of said message;
computing of a delay 1 based on said timestamp 2 and said timestamp 1;
computing of a delay 2 based on said timestamp 4 and said timestamp 3;
computing of a delay 3 based on said timestamp 5, said timestamp 2, and said delay 2;
computing of a delay 4 based on said timestamp 6 and said timestamp 5;
computing of an alpha adjustment associated with said element based on said delay 1, said delay 2, said delay 3, and said delay 4; and
making of said alpha adjustment a part of said plurality of alpha adjustments.

3. The method of claim 1, wherein said method of performing poll frequency tuning further comprising:
obtain an element of said plurality of elements;
obtaining of a number sessions through said element;
obtaining of a number of lossy sessions through said element;
computing of a loss factor based on said number of lossy sessions and said number of sessions;
setting of a faster polling frequency for said element if said loss factor exceeds a pre-defined upper threshold;
setting of a medium polling frequency for said element if said loss factor is in between said pre-defined upper threshold and a pre-defined lower threshold; and
setting of a low polling frequency for said element if said loss factor is less than said pre-defined lower threshold.

4. The method of claim 1, wherein said method of analyzing further comprising:
obtaining of an element of said plurality of elements;
obtaining a poll data record associated with said element, wherein said poll data record is part of said plurality of poll data records;
obtaining of an alpha adjustment factor based on said plurality of alpha adjustments and said element;
adjusting of a timestamp of said poll data record based on alpha adjustment factor;
obtain a session of said poll data record;
making of said session a part of said plurality of sessions;
binding of said poll data record with a plurality of ongoing session records based on said session and the associated session of said plurality of ongoing session records, wherein said plurality of ongoing session records is a part of said plurality of session-wise data records;
binding of said poll data record with a new session based on said session, wherein said poll data record is made part of a plurality of new session records, wherein said plurality of new session records is a part of said session-wise data records; and
binding of said poll data record with a plurality of outlier session records based on said session, wherein said plurality of outlier session records is a part of said plurality of session-wise data records.

5. The method of claim 4, wherein said method further comprising:
checking of a poll rate based on said poll data record obtained from said element; and
reducing of a polling frequency of said element if said poll rate is lower than a pre-defined threshold.

6. The method of claim 4, wherein said method further comprising:
checking of availability of a poll data record from said element; and
increasing of a polling frequency of said element if said poll data record is not available within a pre-defined time period based on a polling frequency associated with said element.

7. The method of claim 1, wherein said method of generating further comprising:
obtaining of a session of said plurality of sessions;
obtaining of a plurality of poll data records based on said plurality of session-wise data records, wherein the associated session of each of said plurality of poll data records is the same as said session;
obtaining of a user device associated with said session, wherein said user device is a part of said plurality of user devices;
obtaining of a plurality session network elements, wherein each of said plurality of session network elements is associated with said session, and each of said plurality of session network elements is a part of said plurality of network elements;
obtaining of a destination element associated with said session, wherein said destination element is a user device of said plurality of user devices or a system of said plurality of systems;
obtaining of a poll A data record obtained from said user device, wherein poll type of said poll A data record is said poll type A of said plurality of poll data types, and said poll A data record is received at the beginning of said session;
obtaining of a poll Z data record obtained from said user device, wherein poll type of said poll Z data record is said poll type Z of said plurality of poll data types, and said poll Z data record is received at the end of said session;
obtaining of a timestamp A of said poll A data record;
obtaining of a timestamp Z of said poll Z data record;
ensuring of a timestamp of a poll data record of said plurality of poll data records is within said timestamp A and said timestamp Z;
obtaining of a plurality of poll S data records from said user device, wherein poll type of each of said poll S data records is said poll type S of said plurality of poll data types;

obtaining of a plurality of poll E data records from said plurality of session network elements, wherein poll type of each of said poll E data records is said poll type E of said plurality of poll data types;

obtaining of a plurality of poll D data records from said destination element, wherein poll type of each of said poll D data records is said poll type D of said plurality of poll data types;

computing of a reliability factor based on said poll A data record, said poll Z data record, said plurality of poll S data records, said plurality of poll E data records, and said plurality of poll D data records;

computing of a short factor based on said poll A data record, said poll Z data record, said plurality of poll S data records, said plurality of poll E data records, and said plurality of poll D data records; and forming of a backup data record of said plurality of backup data records based on said timestamp A, said timestamp Z, said reliability factor, and said short factor.

8. The method of claim 7, wherein said method further comprising:

obtaining a poll A data record obtained from said user device, wherein poll type of said poll A data record is said poll type A of said plurality of poll data types, and said poll A data record is received at the beginning of said session;

obtaining of a timestamp A of said poll A data record;

ensuring of a timestamp of a poll data record of said plurality of poll data records exceeds or equal to said timestamp A;

obtaining of a plurality of poll S data records from said user device, wherein poll type of each of said poll S data records is said poll type S of said plurality of poll data types;

obtaining of a plurality of poll E data records from said plurality of session network elements, wherein poll type of each of said poll E data records is said poll type E of said plurality of poll data types;

obtaining of a plurality of poll D data records from said destination element, wherein poll type of each of said poll D data records is said poll type D of said plurality of poll data types;

computing of a reliability factor based on said poll A data record, said plurality of poll S data records, said plurality of poll E data records, and said plurality of poll D data records;

computing of a short factor based on said poll A data record, said plurality of poll S data records, said plurality of poll E data records, and said plurality of poll D data records;

obtaining of a timestamp Y based on said plurality of poll data records, wherein a timestamp of each of said plurality of poll data records precedes or equal to said timestamp Y; and forming of a backup data record of said plurality of backup data records based on said timestamp A, said timestamp Y, said reliability factor, and said short factor.

9. The method of claim 7, wherein said method further comprising:

obtaining a poll Z data record obtained from said user device, wherein poll type of said poll Z data record is said poll type Z of said plurality of poll data types, and said poll Z data record is received at the end of said session;

obtaining of a timestamp Z of said poll Z data record;

ensuring of a timestamp of a poll data record of said plurality of poll data records precedes or equal to said timestamp Z;

obtaining of a plurality of poll S data records from said user device, wherein poll type of each of said poll S data records is said poll type S of said plurality of poll data types;

obtaining of a plurality of poll E data records from said plurality of session network elements, wherein poll type of each of said poll E data records is said poll type E of said plurality of poll data types;

obtaining of a plurality of poll D data records from said destination element, wherein poll type of each of said poll D data records is said poll type D of said plurality of poll data types;

computing of a reliability factor based on said poll Z data record, said plurality of poll S data records, said plurality of poll E data records, and said plurality of poll D data records;

computing of a short factor based on said poll Z data record, said plurality of poll S data records, said plurality of poll E data records, and said plurality of poll D data records;

obtaining of a timestamp X based on said plurality of poll data records, wherein a timestamp of each of said plurality of poll data records exceeds or equal to said timestamp X; and forming of a backup data record of said plurality of backup data records based on said timestamp X, said timestamp Z, said reliability factor, and said short factor.

10. The method of claim 7, wherein said method further comprising:

obtaining of a plurality of poll S data records from said user device, wherein poll type of each of said poll S data records is said poll type S of said plurality of poll data types;

obtaining of a plurality of poll E data records from said plurality of session network elements, wherein poll type of each of said poll E data records is said poll type E of said plurality of poll data types;

obtaining of a plurality of poll D data records from said destination element, wherein poll type of each of said poll D data records is said poll type D of said plurality of poll data types;

computing of a reliability factor based on said plurality of poll S data records, said plurality of poll E data records, and said plurality of poll D data records;

computing of a short factor based on said plurality of poll S data records, said plurality of poll E data records, and said plurality of poll D data records;

obtaining of a timestamp X based on said plurality of poll data records, wherein a timestamp of each of said plurality of poll data records exceeds or equal to said timestamp X;

obtaining of a timestamp Y based on said plurality of poll data records, wherein a timestamp of each of said plurality of poll data records precedes or equal to said timestamp Y; and forming of a backup data record of said plurality of backup data records based on said timestamp X, said timestamp Y, said reliability factor, and said short factor.

11. The method of claim 7, wherein said method further comprising a method for computing of a reliability factor of said session, said method further comprising:

obtaining of a weight 1 associated with said poll type A of said plurality of poll data types;

obtaining of a weight 2 associated with said poll type S of said plurality of poll data types;

obtaining of a weight 3 associated with said poll type E of said plurality of poll data types;

obtaining of a weight 4 associated with said poll type D of said plurality of poll data types;

obtaining of a weight 5 associated with said poll type Z of said plurality of poll data types;

obtaining of a deviation 1 associated with said poll type A based on the occurrence of a poll data record from said user device, wherein said poll data record is a part of said plurality of poll data records and said poll data record indicates the beginning of said session;

obtaining of a deviation 2 associated with said poll type S based on a plurality of poll S data records from said user device and a poll frequency associated with said user device, wherein each of said plurality of poll S data records is a part of said plurality of poll data records;

obtaining of a deviation 3 associated with said poll type E based on a plurality of poll E data records from said plurality of session network elements and a plurality of poll frequencies associated with said plurality of session network elements, wherein each of said plurality of poll E data records is a part of said plurality of poll data records;

obtaining of a deviation 4 associated with said poll type D based on a plurality of poll D data records from said destination element and a poll frequency associated with said destination element, wherein each of said plurality of poll D data records is a part of said plurality of poll data records;

obtaining of a deviation 5 associated with said poll type Z based on the occurrence of a poll data record from said user device, wherein said poll data record is a part of said plurality of poll data records and said poll data record indicates the end of said session; and computing of said reliability factor based on said weight 1, said deviation 1, said weight 2, said deviation 2, said weight 3, said deviation 3, said weight 4, said deviation 4, said weight 5, and said deviation 5.

12. The method of claim 7, wherein said method further comprising a method of computing a short factor of said session, said method further comprising:

obtaining of a plurality of rules associated with said plurality of poll data records;

computing a plurality of distributions of said plurality of poll data records based on said plurality of poll data types;

applying of said plurality of rules based on said plurality of distributions to determine said short factor.

13. The method of claim 12, wherein said method further comprising:

obtaining of a poll A data record from said plurality of poll data records, wherein poll type of said poll A data record is said poll type A of said plurality of poll data types;

obtaining of a poll Z data record from said plurality of poll data records, wherein poll type of said poll Z data record is said poll type Z of said plurality of poll data types; and setting of said short factor based on a pre-defined value.

14. The method of claim 12, wherein said method further comprising:

obtaining of a poll A data record of said plurality of poll data records, wherein poll type of said poll A data record is said poll type A of said plurality of poll data types;

obtaining of a poll D data record of said plurality of poll data records, wherein poll type of said poll D data record is said poll type D of said plurality of poll data types;

obtaining of a timestamp 1 of said poll D data record, wherein said timestamp 1 exceeds or equal to a timestamp of a poll data record of said plurality of poll data records; and setting of said short factor based on a pre-defined value.

15. The method of claim 12, wherein said method further comprising:

obtaining of a poll A data record of said plurality of poll data records, wherein poll type of said poll A data record is said poll type A of said plurality of poll data types;

obtaining of a poll D data record of said plurality of poll data records, wherein poll type of said poll D data record is said poll type D of said plurality of poll data types;

obtaining of a timestamp 1 of a poll data record of said plurality of data records, wherein said timestamp 1 exceeds or equal to a timestamp of each of said plurality of poll data records;

obtaining of a timestamp 2 of said poll D data record, wherein said timestamp 2 precedes or equal to a timestamp of each of a plurality of poll D data records, wherein each of said plurality of poll D data records is a part of said plurality of poll data records and poll type of each of said plurality of poll D data records is said poll type D, said timestamp 2 precedes or equal to said timestamp 1, and said timestamp 2 is close to said timestamp 1; and setting of said short factor based on a pre-defined value.

16. The method of claim 12, wherein said method further comprising:

obtaining of a poll D data record D of said plurality of poll data records, wherein poll type of said poll D data record is said poll type D of said plurality of poll data types;

obtaining of a poll Z data record of said plurality of poll data records, wherein poll type of said poll Z data record is said poll type Z of said plurality of poll data types;

obtaining of a timestamp 1 of a poll data record of said plurality of data records, wherein said timestamp 1 precedes or equal to a timestamp of each of said plurality of poll data records;

obtaining of a timestamp 2 of said poll data D record, wherein said timestamp 2 precedes or equal to a timestamp of each of a plurality of poll D data records, wherein each of said plurality of poll D data records is a part of said plurality of poll data records and poll type of each of said plurality of poll D data records is said poll type D, said timestamp 2 is exceeds or equal to said timestamp 1 and said timestamp 2 is close to said timestamp 1; and setting of said short factor based on a pre-defined value.

17. The method of claim 12, wherein said method further comprising:

obtaining of a poll D data record 1 of said plurality of poll data records, wherein poll type of said poll D data record 1 is said poll type D of said plurality of poll data types;

obtaining of a poll D data record 2 of said plurality of poll data records, wherein poll type of said poll D data record 2 is said poll type D;

obtaining of a timestamp 1 of a poll data record of said plurality of poll data records, wherein said timestamp 1 precedes or equal to a timestamp of each of said plurality of poll data records;

obtaining of a timestamp 2 of a poll data record of said plurality of poll data records, wherein said timestamp 2 exceeds or equal to a timestamp of each of said plurality of poll data records;

obtaining of a timestamp 3 of said poll data D record 1, wherein said timestamp 3 precedes or equal to a timestamp of each of a plurality of poll D data records, wherein each of said plurality of poll D data records is a part of said plurality of poll data records and poll type of each of said plurality of poll D data records is said poll type D, said timestamp 3 exceeds or equal to said timestamp 1, and said timestamp 3 is close to said timestamp 1;

obtaining of a timestamp 4 of said poll data D2 record, wherein said timestamp 4 precedes or equal to a timestamp of each of a plurality of poll D data records, wherein each of said plurality of poll D data records is a part of said plurality of poll data records and poll type of each of said plurality of poll D data records is said poll type D, said timestamp 4 precedes or equal to said timestamp 2, and said timestamp 4 is close to said timestamp 2; and setting of said short factor based on a pre-defined value.

18. The method of claim 12, wherein said method further comprising:

obtaining of a poll A data record of said plurality of poll data records, wherein poll type of said poll A data record is said poll type A of said plurality of poll data types;

obtaining of a plurality of poll E data records of said plurality of poll data records, wherein poll type of each of said plurality of poll E data records is said poll type E of said plurality of poll data types;

obtaining of a deviation in said plurality of poll E data records based on a plurality of poll frequencies;

checking of closeness of said deviation with a pre-defined upper threshold; and setting of said short factor based on a pre-defined value.

19. The method of claim 12, wherein said method further comprising:

obtaining of a poll Z data record of said plurality of poll data records, wherein poll type of said poll Z data record is said poll type Z of said plurality of poll data types;

obtaining of a plurality of poll E data records of said plurality of poll data records, wherein poll type of each of said plurality of poll E data records is said poll type E of said plurality of poll data types;

obtaining of a deviation in said plurality of poll E data records based on a plurality of poll frequencies;

checking of closeness of said deviation with a pre-defined upper threshold; and setting of said short factor based on a pre-defined value.

20. The method of claim 1, wherein said method of correlating further comprising:

obtaining of a subscriber of said plurality of subscribers;

obtaining of a plurality of subscriber backup data records based on said plurality of backup data records, wherein each of said plurality of subscriber backup data records is associated with said subscriber;

obtaining of a plurality of subscriber call data records based on said plurality of call data records, wherein each of said plurality of subscriber call data records is associated with said subscriber;

obtaining of a plurality of full session subscriber backup data records, wherein a reliability factor associated with each of said plurality of full session subscriber backup data records is close to 1 and a short factor associated with each of said plurality of full session subscriber backup data records is close to 1;

computing of a beta adjustment factor, wherein said computing further comprising:

determining of a plurality of corresponding subscriber call data records, wherein each of said plurality of corresponding subscriber call data records matches with a unique full session subscriber backup data record of said plurality of full session subscriber backup data records based on said beta adjustment factor;

adjusting of a timestamp of each of said plurality of subscriber call data records based on said beta factor resulting in a plurality of adjusted subscriber call data records.

21. The method of claim 20, wherein said method further comprising:

obtaining of a call data record of said plurality of adjusted subscriber call data records;

obtaining of a backup data record of said plurality of subscriber backup data records, wherein said backup data record best matches with said call data record;

obtaining of a reliability factor associated with said backup data record, wherein said reliability factor exceeds a pre-defined upper threshold 1;

obtaining of a short factor associated with said backup data record, wherein said short factor exceeds a pre-defined upper threshold 2;

combining of said call data record and said backup data record to generate a modified call data record; and making of said modified call data record a part of said plurality of regenerated call data records.

22. The method of claim 21, wherein said method further comprising:

obtaining of a reliability factor associated with said backup data record, wherein said reliability factor exceeds a pre-defined upper threshold 1;

combining of said call data record and said backup data record to generate a modified call data record; and making of said modified call data record a part of said plurality of regenerated call data records.

23. The method of claim 21, wherein said method further comprising:

obtaining of a short factor associated with said backup data record, wherein said short factor exceeds a pre-defined upper threshold 2;

combining of said call data record and said backup data record to generate a modified call data record; and making of said modified call data record a part of said plurality of regenerated call data records.

24. The method of claim 21, wherein said method further comprising:

obtaining of a reliability factor associated with said backup data record;

obtaining of a short factor associated with said backup data record;

checking of partialness of said call data record;

combining of said call data record, said backup data record, said reliability factor, said short factor to generate a modified call data record; and making of said modified call data record a part of said plurality of regenerated call data records.

* * * * *